United States Patent [19]
Huckins

[11] Patent Number: 6,038,593
[45] Date of Patent: Mar. 14, 2000

[54] REMOTE APPLICATION CONTROL FOR LOW BANDWIDTH APPLICATION SHARING

[75] Inventor: Jeffrey L. Huckins, Beaverton, Oreg.

[73] Assignee: Intel Corporation, Santa Clara, Calif.

[21] Appl. No.: 08/781,901

[22] Filed: Dec. 30, 1996

[51] Int. Cl.[7] .................................................. G06F 15/16
[52] U.S. Cl. ........................................... 709/217; 709/205
[58] Field of Search ........................ 395/200.33, 200.47, 395/200.6, 200.3, 200.77; 707/104, 10; 709/200, 203, 204, 205, 213, 217, 227, 228; 345/330

[56] References Cited

U.S. PATENT DOCUMENTS

| | | | |
|---|---|---|---|
| 5,517,645 | 5/1996 | Stutz et al. | 395/700 |
| 5,613,148 | 3/1997 | Bezviner et al. | 395/651 |
| 5,692,184 | 11/1997 | Ardoin et al. | 395/614 |
| 5,699,518 | 12/1997 | Held et al. | 395/200.54 |
| 5,724,588 | 3/1998 | Hill et al. | 395/684 |
| 5,761,499 | 6/1998 | Sonderegger | 395/610 |
| 5,761,510 | 6/1998 | Smith, Jr. et al. | 395/704 |
| 5,794,006 | 8/1998 | Sanderman | 395/500 |
| 5,802,367 | 9/1998 | Held et al. | 395/685 |
| 5,805,823 | 9/1998 | Seitz | 395/200.66 |
| 5,805,885 | 9/1998 | Leach et al. | 395/683 |

OTHER PUBLICATIONS

Brockschmidt, Kraig, Custom Components and the Component Object Model, *Inside OLE*, second edition, Chapter 5, pp. 219–276 (1995).

Brockschmidt, Kraig, Local/Remote Transparency, *Inside OLE*, second edition, Chapter 6, pp. 277–338 (1995).

*Primary Examiner*—Mehmet B. Geckil
*Attorney, Agent, or Firm*—Blakely, Sokoloff, Taylor & Zafman LLP

[57] ABSTRACT

An object-oriented distributed service architecture is disclosed as including a client, a "distributed" interface server, and a "local" interface server residing on each computer that is part of an application sharing session. The distributed server communicates with other similar distributed servers on remote computers, and enables a remote implementation of a function invoked by the local client. In response to a function call through a local interface, the distributed server packages an instance identifier for a remote interface residing on a remote machine, together with a function identifier and any arguments required for the function. The message packet is then sent off to remote machines. Each such remote interface had been created as an instance of the local interface in response to a previous message from the local interface. When another distributed server receives the message, the function is invoked through the interface associated with the received instance identifier, resulting in implementation of the function at the remote site.

17 Claims, 5 Drawing Sheets

REMOTE APPLICATION CONTROL FOR LOW BANDWIDTH APPLICATION SHARING

BACKGROUND

This invention is generally directed at distributed service architectures, and more specifically at an application control and sharing architecture involving two or more users.

Distributed services are software components residing on different hardware platforms but whose distribution is transparent to the user, i.e., the various components and hardware appear to a user as one system. One way in which multiple users can receive the benefit of distributed services from each other is through the so-called sharing of an application that is running on each user's machine. Although described as sharing, a separate copy of the application is actually running on each machine. Such a scheme is also known as remote application control and is becoming an important aspect of video conferencing and other techniques for conducting meetings through computers linked to each other.

An application sharing session begins typically with a user launching an application such as a graphical presentation software package. The first user notifies other users of the beginning of the session, either by telephone or otherwise, and after which the other users also launch the same application on each of their own machines. Alternatively, a mechanism may be provided to allow the first user to launch the application in all other user machines. Several files may then be exchanged among the users to bring each user up to date. In most cases, a copy of all data used by the application is stored and cached on each machine.

When a user makes a change to an existing document or creates a new document on his or her machine, the modified document should appear on all of the other user machines in the session. Thus, if a user were to suggest a new color or shape for a particular object in a figure being viewed by all of the users, the first user would like to have this change reflected as quickly as possible in all of the other user machines.

In some prior art application sharing schemes, the entire document as modified by a user is packaged as a whole and sent off to the other users. Because the modified document may include graphics and even audio information as well as simple text, a large amount of information will need to be communicated between the users. If the session includes user machines that connect via telephone lines, however, then well-known communication bandwidth constraints may prevent the speedy transfer of such rich documents between the users. Since the communication bottleneck is the limited rate at which information can travel through the telephone lines, a low bandwidth application sharing architecture that generates the least amount of data for transfer among the users is needed.

Another desirable feature in an application sharing session would be to operate in a multicast environment. In such an environment, the application sharing scheme must allow a user, together with her shared application running on her machine, to support a number of connections to a number of other users who are part of the application sharing session, without her application having to know the exact identity and network address of the other users. Finally, such an optimal application sharing architecture should be implemented so as to operate, with minimal additional modifications, on a number of different computing platforms. These platforms may include different hardware as well as different operating systems.

Several attempts at meeting the above described challenges have been made. For example, in the protocol specification T120 relating to multipoint data communication, command packets are sent to another user at a remote location for handling by the application at the remote location in a hierarchical group routing scheme. A draw back of this technique is limited performance, since the hierarchical group topology requires the routing of packets through multiple intermediate endpoints rather than directly to each destination group member. Each intermediate endpoint must forward the packets to zero or more destination leaf nodes. Each leaf node in turn may have a number of child nodes attached to itself, such that arrival of a command packet at a final destination group member is delayed.

Another potential solution to the application sharing problem would be to use a request/response protocol such as the Remote Procedure Call (RPC) based on standards defined in the Distributed Computing Environment created by the Open Software Foundation. With RPC, it is possible to write a program on a first machine that calls a subprogram implemented on a second machine. In such a request/response protocol, the first user sends a request message to designated users, the message containing controls and commands as well as perhaps data, and expects a response acknowledging receipt of the message.

The problem, however, with using RPC is the well-known "acknowledge explosion" in which a response acknowledging the receipt of the message is sent by all those who receive the message. In a request/response protocol, all users who receive the request must send a response back to the originating user or else the message packet is resent to enforce reliability. Therefore, if the application sharing session is to proceed using RPC in a multicast environment where the first user in effect broadcasts its messages to all other users in the session, then an additional mechanism must be provided for the user to handle the acknowledge responses that will be coming in from all of the other users.

To avoid the acknowledge explosion described above, a NACK (negative acknowledgment) protocol may be used wherein the first user presumes its message has been received, unless otherwise indicated. Protocol specifications have been developed and implemented which use this technique successfully to deliver the required 100% delivery guarantees.

Yet another technique for creating an application sharing architecture is based on the Object Linking and Embedding (OLE) environment developed by Microsoft Corp. OLE is a unified environment of object-based services with the capability of both customizing those services and arbitrarily extending the architecture through custom services, with the overall purpose of enabling integration between components. OLE allows an application to define an interface which other applications can connect to control the application, under the title Automation. But OLE Automation is limited to local applications running on the same machine. Problems with migrating the RPC protocol to OLE Automation include the above described acknowledge explosion.

Finally, a technique exists to intercept application function calls to the operating system and to transmit each such call to all nodes in the application sharing session. Some problems with such a technique are the use of undocumented and unsupported subsystem data structures, and the platform dependence of the implementation. This technique was feasible in the 16-bit Microsoft Windows operating system, but is not directly supported by more advanced 32-bit operating systems. Protection subsystems of more advanced operating systems such as Microsoft Windows 95 and Windows NT do not easily allow such intrusive techniques to be implemented. So, although such a scheme might be possible, it requires programming in kernal space (Ring 0), deep within the confines of the operating system. Furthermore, such a solution is operating system dependent, a serious product marketing drawback.

SUMMARY

This invention is directed at a low-bandwidth distributed service architecture that works in a multicast environment and enables remote application control among multiple machines connected by a communication pipe. An interface object defines a list of functions that are slated for both local and remote implementation. In addition to a copy of the application, each machine includes a software component known as a Remote Implementation (RI) interface server which provides an implementation for a function called by the application. The RI interface server is for sending and receiving protocol data units (PDUs) to and from another machine through the communication pipe linking the machines. The RI server also creates an RI interface in response to the application's request to do so. The RI interface is for handling function calls from the application, and for creating an instance of itself, called a local-implementation (LI) interface, in a remote machine. In operation, when a user invokes a function that is slated by the application for both local and remote implementation, the application makes the function call through the RI interface. In response, the RI server will create a PDU that includes the object identification (OID) of the RI interface and a unique function ID (FID) identifying the particular function that was invoked. The PDU is then forwarded to the communication pipe. When the PDU is received by a RI server in a remote machine, the RI server uses the OID and FID contained in the PDU to invoke the function through the previously created LI interface. A local implementation of the function in the remote machine is then performed.

By packetizing only the identifiers for the interface and function rather than the entire data object on which the function operates in the local machine, this invention reduces the required bandwidth for application sharing. Also, in using the RI interface, the application in the originating machine need not concern itself with the new distributed implementation of its functions, because the actual implementation of a function is encapsulated in an object in the remote machine. This invention can also support a multicast environment without the need for complicated operating system programming techniques.

DRAWINGS

These and other features, aspects, and advantages of this invention will be better understood with regard to the following description, appended claims, and accompanying drawings where:

DETAILED DESCRIPTION

Figure 1:
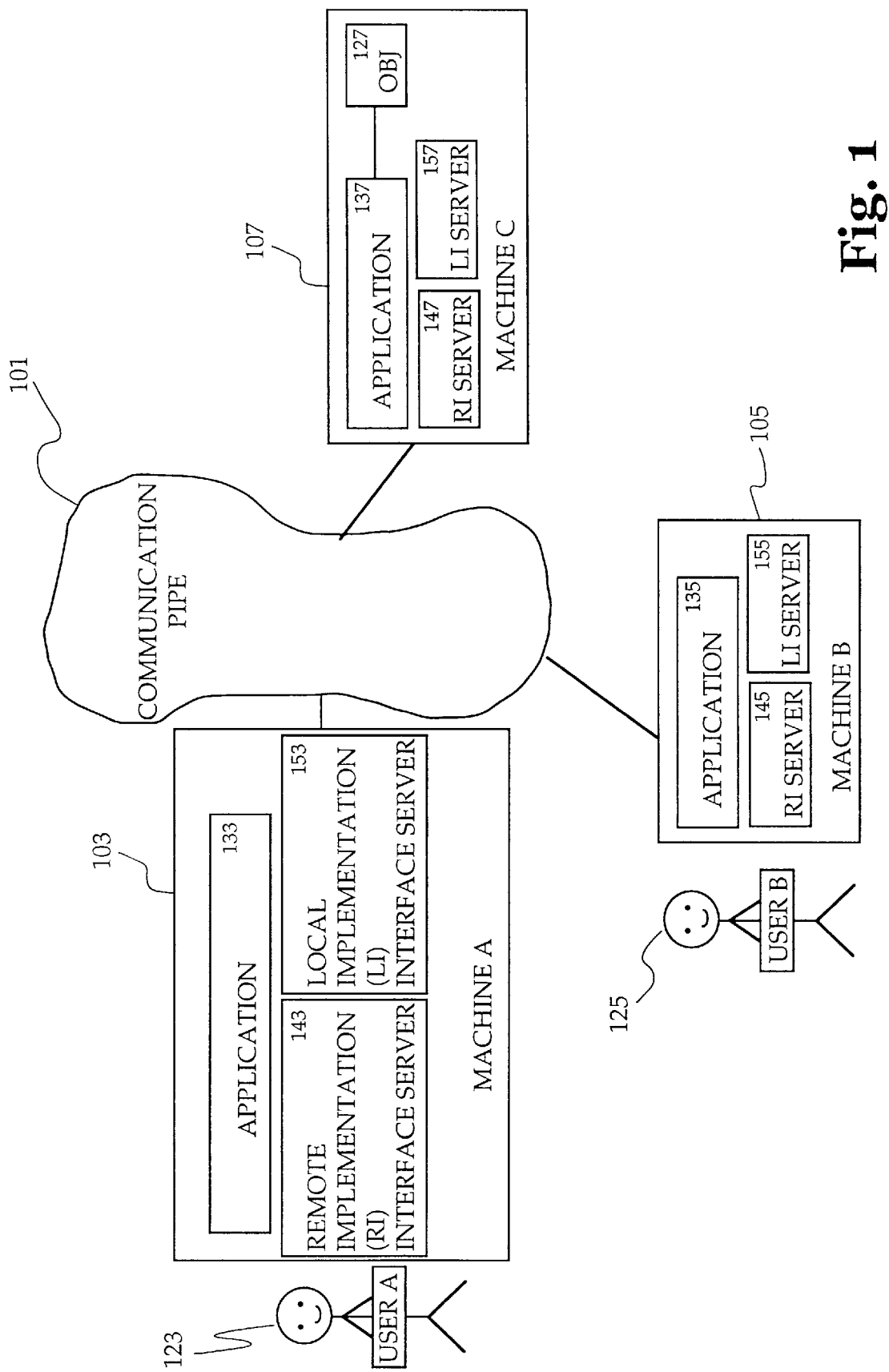
FIG. 1 shows multiple users sharing an application.

FIG. 1 illustrates an exemplary setting for this invention, where a communication pipe 101 is tapped into by multiple machines 103, 105 and 107 in which a copy of the same application will be running. Although only three machines are shown, more machines can also be included in the application sharing architecture of this invention. Machine 103 has an application 133 running with perhaps a human user 123 operating the application. The same scenario may be occurring at machine 105 with application 135 and user 125. Machine 107 is shown with application 137 connecting to software component 127 instead of to a human user. The communication between the various machines through the communication network 101 can be accomplished using known techniques in the art. In a preferred embodiment of this invention, the communication pipe supports a multicast protocol wherein a machine does not necessarily have a one to one relationship with another machine. In a multicast environment, a given machine can usually support any number of connections to any number of other machines without actually knowing the address for each machine.

The preferred embodiment of this invention is based on the component object model (COM) architecture. COM is a specification that describes the software notions of software objects, interfaces, and other mechanisms necessary to access software components given only a unique identifier. An object is a data structure encapsulated with a set of routines, called "methods" or "functions", which operate on the data. Typically, operations on the data can only be performed via these functions. The functions are also common to objects that are instances of a particular "class." Each class is typically a separate software module and includes functions or code that can be passed down a hierarchy to a subclass.

Procedure calls are described in term of "message passing." A message names a function and may optionally include other arguments. When a message is sent to an object, the function is looked up in the object's class to find out how to perform that operation on the given object. Thus, in the embodiment shown in FIG. 1, each application is in effect an object under the COM specification. Moreover, the human user 123 can be replaced by a software component (object) that interfaces with application 133.

Under COM, two objects communicate through an interface which lists a group of semantically related functions each having one or more arguments. Note that an object can have many interfaces. These interfaces may form a part of the first object's source code, or they may be part of another object owned by the first object. Thus, in comparison with algorithmic programming, COM allows communication between a client (a user of objects) and a server (a provider of a service) primarily through objects rather than function calls. Under COM, the actual implementation of a function defined in an interface may occur in any given object such that the client will be totally unaware of the actual implementation of the function it has requested through the interface.

COM also allows clients to communicate with both local and remote objects. From the client's perspective, any function call to any object's interface should be an in-process call, regardless of how the interprocess or intermachine communication occurs between the client and the object. From the object's perspective, the object receives interface calls as if the client were in the same address space as well. Thus, the client should call some in-process code when making an interface call, and the object receives that call from some code in its own process. To allow such a scheme, each machine in FIG. 1 includes a Remote Implementation (RI) interface server and a Local Implementation (LI) interface server. Although shown as part of a system in FIG. 1, each RI server 143 may be bundled together with its application 133 to be sold as part of a software package. In addition, LI server 153 can also be included in the same package. The package can take the exemplary form of a conventional CD-ROM.

The RI server 143 provides access to a remote implementation of any functions slated by the resident application 133 to be implemented remotely. The LI server 153 enables a local implementation, i.e., on machine 103, of the same functions. The RI and LI servers on machines 105 and 107 operate in the same way as the servers in the exemplary machine 103. The LI server 153 creates instances of a class object. The application 133 expects this "LI" class object to support one or more interfaces of interest to the application. The LI class object that the LI server creates is for implementing the class object's interface functions locally in a manner to produce the end result that the application expects.

The RI server 143 also creates class objects which support the identical interfaces as its LI class object counterpart. However, these RI class objects do not themselves produce the end result expected by the application. Rather, they rely on an exclusive LI class object on the same machine, as well as an exclusive LI class object residing on one or more remote machines to produce the results expected by the application. When a RI class object is instantiated by the application 133, the RI class object creates a new LI class object that it uses to accomplish on the local machine 103 the actions expected by the application 133. In this way, the application 133 is unaware that its request is "intercepted" by the RI class object. Such a request is then sent to the exclusive instance of the LI object residing on the remote machine(s), as well as to the exclusive instance of the LI object residing locally. The exclusive class object residing on the local machine then produces the end result that the application expects. This exclusive LI class object residing on the local machine behaves just as if one of its interface methods had been invoked directly by the application 133, instead of by the "owning" RI class object.

Figure 2:
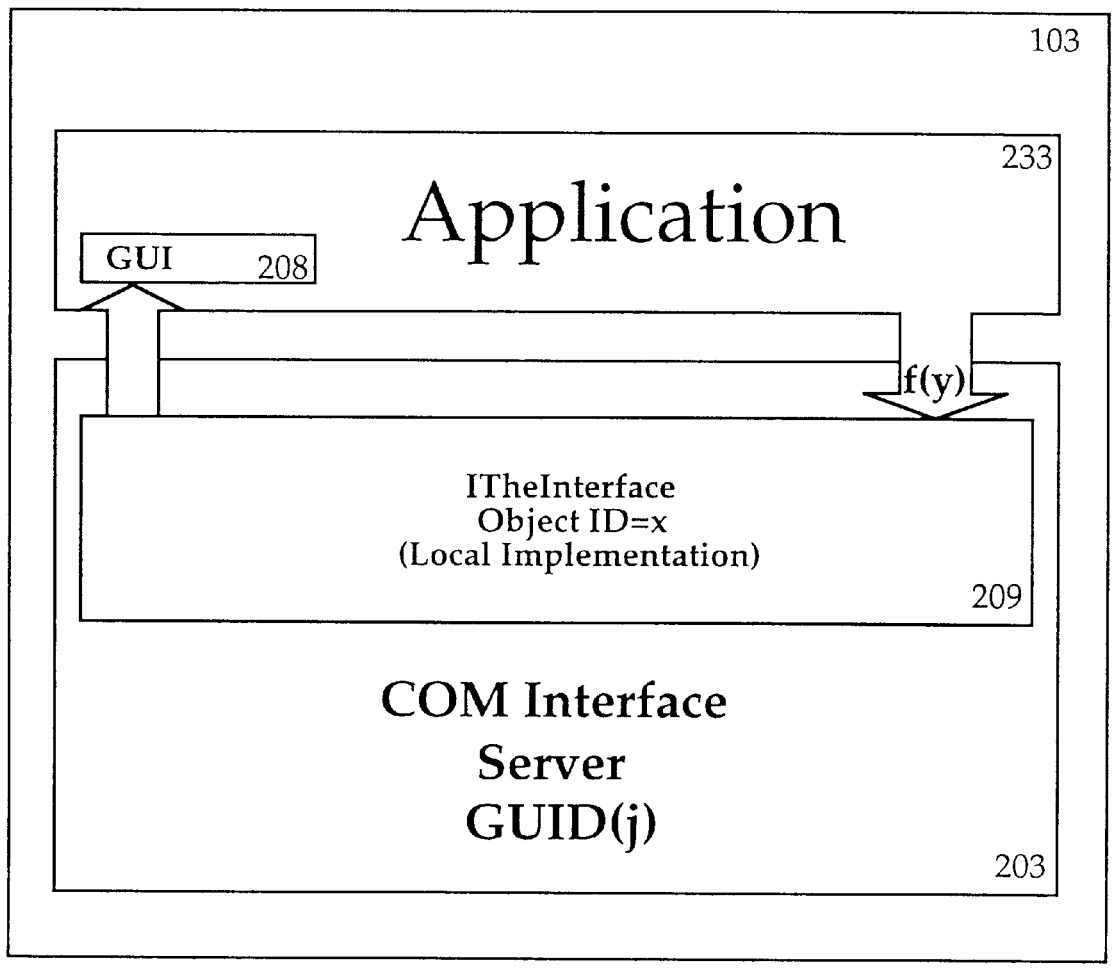
FIG. 2 shows a data flow diagram for local only implementation of a function invoked by an application.

Before discussing the remote implementation aspects of this invention in greater detail, an example of a COM-based architecture for handling an application's function calls locally is shown in FIG. 2. Typically, application 233 is aware of the class "ITheInterface" which lists functions slated for local implementation on machine 103. In a typical word processing application, such a class would be IDocument. The application 233 creates the class object residing either in the application's own process space or in another process space on the machine 103. The following exemplary code sample illustrates how the application 233 creates the object:

```
IDocument* Document = NULL;
HRESULT hr = CoCreateInstance(
        CLSID_         //Class identifier (CLSID) of the object
        Document,
        NULL,          //Pointer to whether object
                       is or isn't part of an
aggregate
        CLSCTX_LOCAL-  //Context for running executable code
        SERVER,
```

-continued

```
        IID_IDocument, //Reference to the identifier of the interface
        &Document)
                       //Indirect pointer to requested interface
// Now use the IDocument interface
int StartLine = 0;
int EndLine = 2;
int StartColumn = 0;
int EndColumn = 80;
Document—>Create("MyFile.Txt"); // Create from text file
// Example of Select, Cut, Copy and Paste methods
Document—>Select(StartLine, StartColumn, EndLine, EndColumn);
Document—>Cut(StartLine, StartColumn, EndLine, EndColumn);
Document—>Copy(StartLine, StartColumn, EndLine, EndColumn);
// Paste the cut or copied text in line 12, column 3
int PasteLine = 12;
int PasteColumn = 3;
Document—>Paste(PasteLine, PasteColumn);
```

Application 233 obtains an interface 209 from COM interface server 203, having a globally unique identifier GUID(j). Interface 209 is an instance of ITheInterface, and has an object identification (OID) X. Server 203 has a GUID(j) and provides access to local implementation of the function f(y) with results of the performed function being displayed to the user through the graphical user interface (GUI) 208. However, before the application connects with a desired COM server, the application needs to first obtain the GUID of the desired COM server. This can be done by either embedding the GUID value in the binary code of the application 233 at application build time, or by obtaining the GUID value at run time from a configuration file or the system registry of the operating system. Exemplary operating systems that support such a configuration file and system registry include Windows 95 and Windows NT both developed by Microsoft Corp.

After having obtained the GUID of COM interface server 203, the application 233 creates interface 209 as an instance of ITheInterface. Interface 209 has an exemplary compiler independent definition, using the C++ programming language, as follows:

```
DECLARE_INTERFACE_ITheInterface,IUknown
/*ITheInterface methods*/
STDMETHOD (function-A) (int arg0) PURE //f(0)
STDMETHOD (function-B) PURE //f(1)
STDMETHOD (function-C) (long arg0 int arg1, char* arg2) PURE //f(2)
```

The comments trailing each function declaration above indicate the function identifier (FID) that is assigned for each function listed in interface 209. The functions are predefined by interface definition. Each unique interface, such as IDocument, is identified by a GUID which the client application 233 and server 203 are aware of. The unique interface must also be identically defined by both client and server 203.

When the application 233 sends a message through the interface 209 requesting that a function f(y) be performed by some object, a local (i.e., on the same machine through either an .EXE or .DLL module) implementation of f(y) occurs where a local object performs the method f(y) on some data. The class of which interface 209 is a member will have defined the implementation for method f(y). In FIG. 2, such a local object is shown as residing in application 233, although the local object could alternatively reside in another process on the same machine. In addition, the resulting changes to the data may be displayed to the user via the graphical user interface (GUI) 208 associated with the first application 233.

Figure 3:
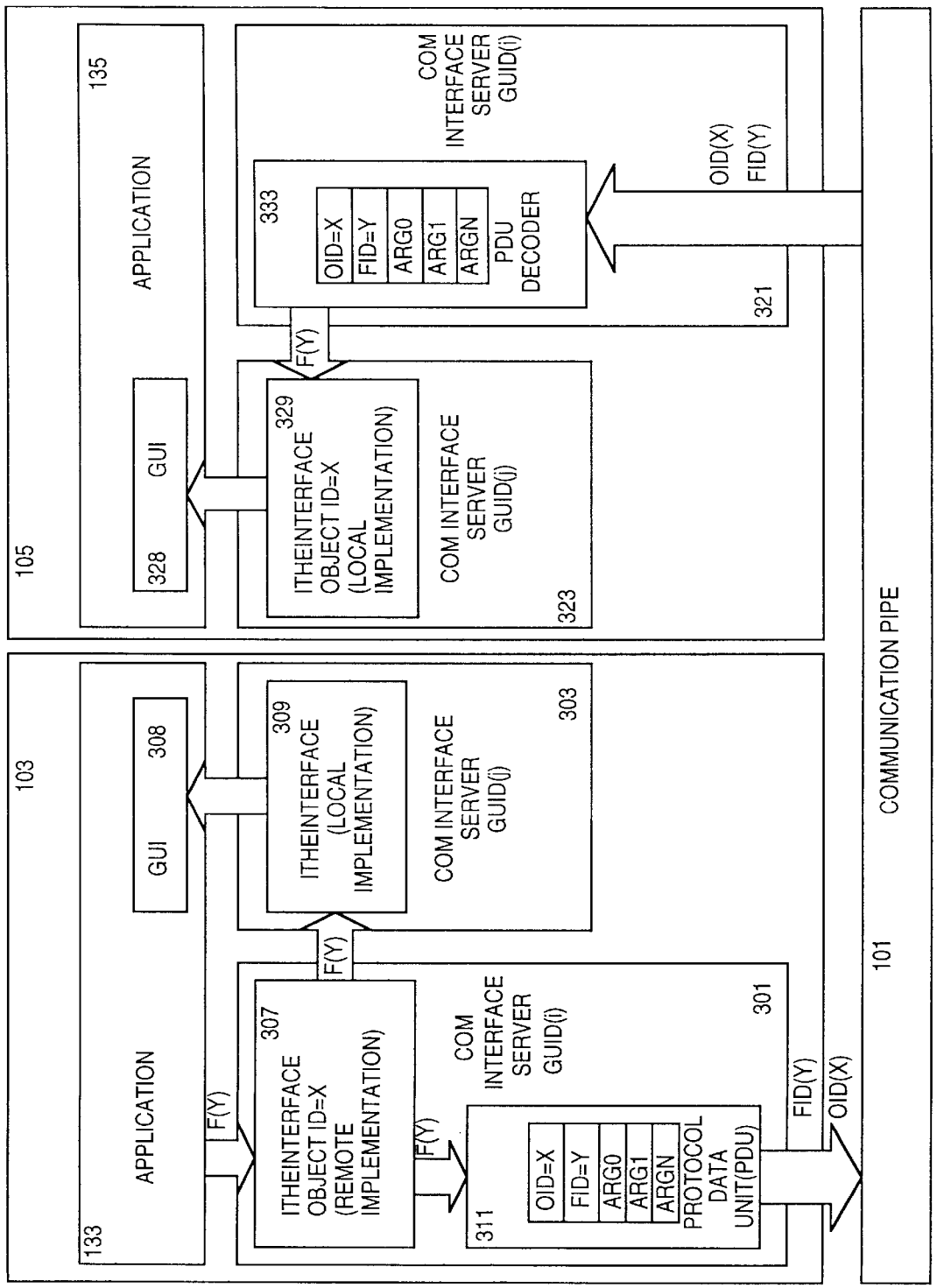
FIG. 3 shows a data flow diagram of application sharing between two machines.

FIG. 3 illustrates a data flow diagram for remote implementation and the preferred embodiment of this invention. The embodiment shown in FIG. 3 is limited to two machines 103 and 105 in which applications 133 and 135 are running. This limitation, however, is solely meant to ease an understanding of this invention, and is not meant to limit the invention to only two machines.

To allow remote control of a similar application, application 133 creates remote-implementation (RI) interface 307 through assistance by COM interface server 301 rather than the "local-implementation" COM interface server 303. This occurs because GUID(j) of server 303 will have been replaced with GUID(i) of server 301. Once again, the GUID for server 301 may be obtained by either embedding the GUID value in the binary code of application 133, or by the application 133 at run time from its application configuration file or the system registry of the operating system. The change in server GUID can be invoked directly by user 123 selecting the change in the application 133, or by a switcher task which allows user 123 to select the "mode" of operation. If the user selects the distributed mode of operation, the switcher task would simply modify the system registry or application configuration file for application 133 to specify GUID(i) of the "distributed" server 301 as the server GUID that application 133 should use for its function calls. To switch back to local mode, the switcher task would reset the configuration file to GUID(j) of the "non-distributed" server 303.

Thus, for each local implementation (LI) interface 309 to be instantiated by application 133 via a function call to the COM subsystem for local implementation of its functions, a RI interface 307 is first obtained through server 301 for remote implementation of the functions. Furthermore, for each instance of ITheInterface instantiated on machine 103, the server 301 will assign a session wide unique object identifier (OID) to each new instance. In addition, server 301 will send a control message over the typically reliable communications pipe 101. The message will be received by all other machines connected to the pipe 101, an example of which is shown at a server 321 in machine 105 of FIG. 3. The control message will contain the new OID "X" and will instruct server 321 to instantiate an associated interface object 329 (a local-implementation (LI) interface) and to associate it with the same OID X.

For the remainder of the application sharing session, every time a function that has been selected for remote implementation is invoked by application 133 on interface 307, server 301 will send a Protocol Data Unit (PDU) 311 along the communication pipe 101. Each PDU 311 will contain the OID X which identifies interface 329 that was previously instantiated in a remote machine. Note that the OID need not be globally unique, i.e., the identification may last only so long as the application sharing session lasts.

Once the interfaces 307 and 329 have been configured as described above, the architecture illustrated in FIG. 3 allows the operation of two data paths when application 133 invokes a function f(y). The first path, lying entirely within machine 103, will be from application 133 to interface 307 which will invoke f(y) locally through interface 309 residing in interface server 303. A local object residing on machine 103 will then perform f(y). This will perhaps cause changes to local data on machine 103, such as updating a drawing, which may be displayed to user 123 through graphical user interface 308.

The second path proceeds as follows. In response to receiving a call through interface 307, server 301 packages the OID for interface 307 and a FID f(y) for the invoked function, along with any arguments required for the function f(y), into PDU 311. Although the function f(y) will typically be a command, such as cut, paste, or copy, a control-type message to open or close application 135 in machine 105 could also be sent. In either case, the message will include the target interface instance identification, unique function identification, and arguments associated with the function, the latter shown as arguments 0–n in PDU 311 of FIG. 3. The PDU 311 is then forwarded to the communications pipe 101.

When PDU 311 arrives at an exemplary machine 105, it is routed using conventional techniques to server 321. PDU decoder 333 then decodes the received PDU and invokes function f(y) on interface 329. Interface 329 is obtained through a call to the COM subsystem in machine 105, in the same way as interface 309 was obtained in machine 103. This results in the implementation of f(y) by an object residing on machine 105. For example, the object can reside in application 135 and will cause changes to data stored in machine 105. Such changes can then be displayed to user 125 (see FIG. 1) through graphical user interface 328.

The above objects and methods described in the previous paragraph will also occur at a number of other machines connected to the communication pipe 101, provided the machine is similarly equipped with server 321, interface 329, and application 135. As mentioned earlier, the network address for such additional machines need not be known by any application or user that is participating in the session, so long as the communication pipe 101 and the interface servers 301 and 321 support a multicast protocol. An example of a communication protocol which supports a multicast protocol is the Transmission Control Protocol/Internet Protocol (TCP/IP).

Figure 4:
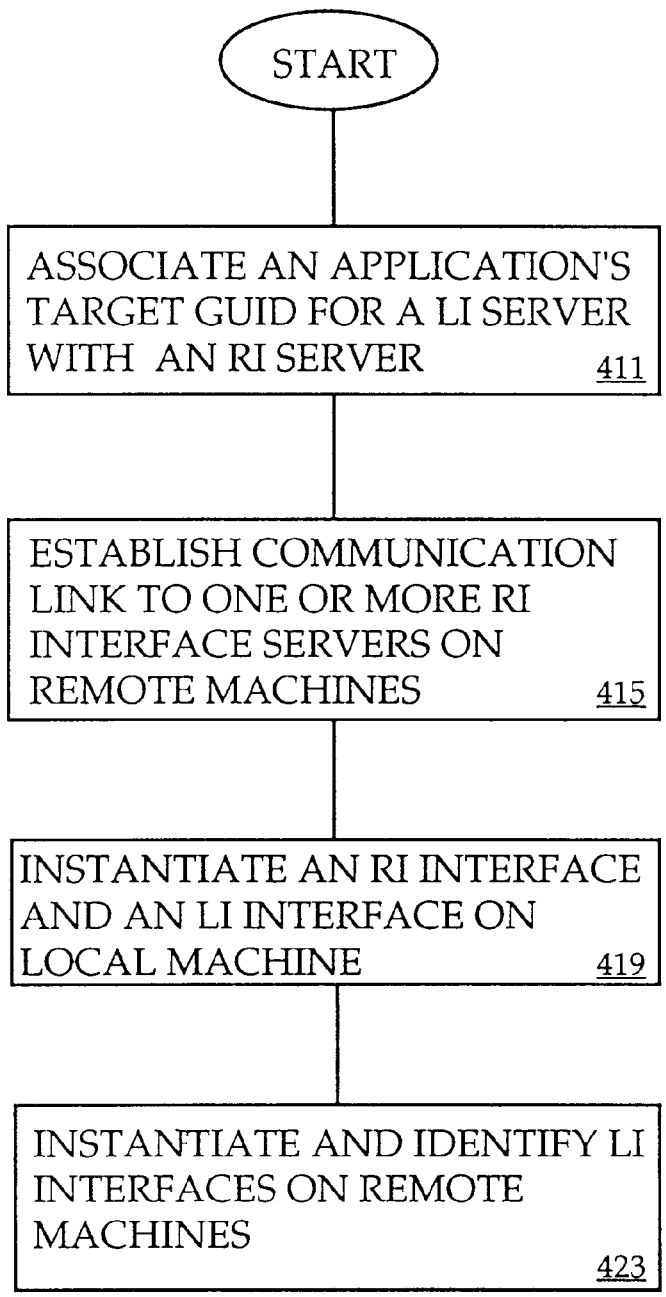
FIG. 4 illustrates the steps involved in setting up the application sharing session of this invention.

FIG. 4 illustrates an exemplary method of setting up the application sharing scheme of this invention as structured in FIG. 3. After an application 133 has been launched in a machine 105, the application's target GUID for a local implementation (LI) interface server 303 will be associated with the GUID for a remote implementation (RI) interface server 301 in step 411. As discussed earlier, user 123 can switch between local-only and distributed implementation of the functions associated with application 133 simply by invoking the change in GUID for its interface server.

Next, in step 415, a communication link is established between server 301 and one or more similar RI interface servers on remote machines as required by well-known protocols such as TCP/IP. In the two-machine example of FIG. 3, such a remote RI interface server will be server 321 in machine 105.

Once the communication link has been established, in step 419, each application which desires a remote implementation of its functions instantiates an RI interface 307 on the respective machine the application is running on. This may be typically accomplished by a COCreateInstance function call to the COM subsystem on each machine. The COCreateInstance function accepts the GUIDs for an interface server and an interface "ITheInterface," both of which are available to the application either at compile time or by a task switching means discussed above. The call to the COM subsystem will return a pointer to a new instance of ITheInterface, and an OID X is assigned to such new instance. If GUID(i) had been selected, then looking purely from a unidirectional point of view (from source machine 103 to destination machine 105), application 133 at the source machine creates an RI interface 307/LI interface 309 pair on the server machine 103 for each CoCreateInstance( ) call, and a single resulting LI interface 329 instance on the one or more destination machines 135. If, however, the application 133 used GUID(j) in a call to CoCreateInstance( ), a single LI interface 309 instance would be created only on machine 103, as the RI server 301 would not be involved. Thus, for remote implementation, each RI interface will in turn instantiate a like interface 309 on the same machine with respect to the original local implementation.

In step 423, as each RI interface 307 is being instantiated, it sends a message to all RI interface servers 321 to which RI interface 307 is connected identifying the LI interface 329 to instantiate inside the remote machine, together with the unique object identifier ID X assigned to such new instance of ITheInterface.

Once the above steps have been completed in a given machine 103 and a destination machine 105, application 133 can invoke its functions for implementation on machine 105. If, however, application 135 wishes its functions to be implemented on machine 103, then the above steps must be repeated by application 135 on machine 105, i.e., a new and unique pair of RI interfaces must be created in machine 135 together with a corresponding LI interface on the now destination machine 103.

Figure 5:
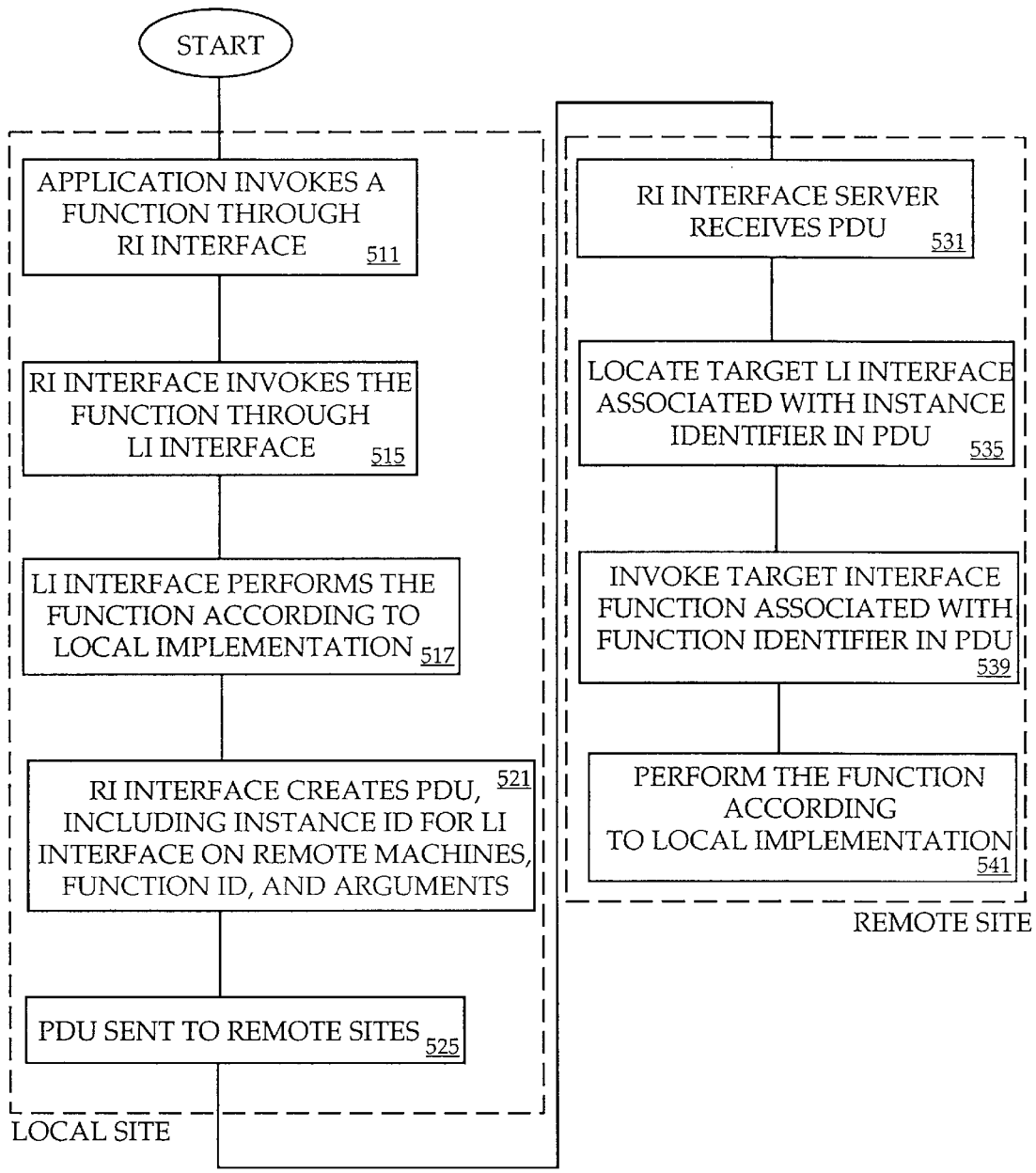
FIG. 5 is a flow chart of the steps involved in implementing remote application control according to this invention.

FIG. 5 is a flowchart of an exemplary distributed implementation of a function in the application sharing session of this invention. Steps 511 to 525 are conducted at the local site, whereas steps 531 to 541 occur at the remote site. In step 511, the application 133 invokes a function through its RI interface 307. Immediately following that step, in step 515, the RI interface 307 invokes the same function on the LI interface 309 to result in a local implementation of the function in machine 103 as in step 517. This local implementation may include displaying data modifications to the user through a graphical user interface 308.

In step 521, RI interface 307 creates a message protocol data unit (PDU) 311 containing an instance identifier for the LI interface 329 in machine 105, a function identifier for the invoked function, and any function arguments and values as required by the particular function. The RI interface 307 then sends the PDU 311 to all other RI interface servers, such as server 321 in machine 105, to which RI interface 307 is connected.

In step 531, RI interface server 321 receives a PDU in a remote machine 105. Server 321 then locates the target LI interface 329 associated with the instance identifier found in the received PDU 311, as per step 535. Next, in step 539, server 321 invokes the target interface function associated with the function identifier found in the received PDU 311. Finally, step 541 provides that the target LI interface 329 performs the function according to a local implementation on machine 105, which may include displaying data modifications to the user through a graphical user interface 328.

The embodiment of the application sharing architecture described above for exemplary purposes is, of course, subject to other variations in structure and implementation within the capabilities of one reasonably skilled in the art. Thus, the details above should be interpreted as illustrative and not in a limiting sense.

What is claimed is:

1. A computer-implemented method of performing functions on a remote machine, the functions to be invoked by a first application in a local machine, a communication pipe coupling the local and remote machines, the method comprising the steps of:

a) creating a remote-implementation (RI) interface on a local machine, the RI interface defining a function;

b) creating a second local-implementation (LI) interface in a remote machine as an instance of the RI interface;

c) sending an instance identifier for the second LI interface and a function identifier for the function into the communication pipe in response to the first application invoking the function through the RI interface; and d) performing the function through the second LI interface on the remote machine in response to receiving the instance identifier and the function identifier.

2. The method of claim 1 wherein the step of sending an instance identifier and a function identifier further comprises sending arguments associated with the function.

3. The method of claim 1 wherein the communication pipe supports a reliable multicast protocol, and wherein step a) of claim 1 is performed in each of a plurality of machines coupled to the communication pipe.

4. The method of claim 1 further comprising the steps of:

creating a first LI interface on the local machine as an instance of the RI interface; and performing the function through the first LI interface on the local machine in response to the first application invoking the function through the RI interface.

5. The method of claim 4 wherein the function is implemented as part of the first application.

6. The method of claim 1 further comprising the steps of associating a globally unique identifier (GUID) of a LI interface server with a GUID of a RI interface server, both servers residing on the same computer, the LI interface server containing a local implementation of the function, the RI interface server for creating the second LI interface in the remote machine.

7. An object-oriented distributed service architecture comprising:

first and second computers connected by a communication pipe;

first client residing within the first computer and accessing a remote implementation (RI) interface defining a function implemented in the first computer, a second local-implementation (LI) interface created in the second computer as an instance of the RI interface;

first RI interface server residing within the first computer for creating a protocol data unit (PDU) and sending the PDU into the communication pipe in response to the client invoking the function through the RI interface, the PDU including an instance identifier associated with the second LI interface and a function identifier associated with the function; and second RI interface server residing within the second computer for invoking the function through the second LI interface in response to receiving the PDU from the communication pipe, the function implemented in the second computer.

8. The architecture of claim 7 wherein the communication pipe and first and second RI interface servers support a reliable multicast protocol.

9. The architecture of claim 7 wherein the RI interface creates a first LI interface as an instance of the RI interface, the first LI interface for performing the function on the first computer in response to the first client invoking the function through the RI interface.

10. The architecture of claim 7 wherein the function and the first client are implemented as part an application program.

11. The architecture of claim 10 further comprising a first LI interface server residing in the first computer for creating the first LI interface, the first LI interface server having a globally unique identifier (GUID) associated with a GUID for the first RI interface server.

12. An article of manufacture comprising:
a machine-readable medium having instructions which when executed on a first computer cause the steps of
creating a remote-implementation (RI) interface in the first computer, the RI interface defining a first function being implemented in the first computer and at least one second computer, the first and second computers being connected by a communication pipe; and
sending from the first computer to the second computer an instance identifier of a second local implementation (LI) interface and a function identifier of a function in response to an application program in the first computer invoking the function through the RI interface, the second LI interface being an instance of the RI interface.

13. The article of claim 12 wherein the medium has further instructions which when executed cause the further steps of:
creating a first LI interface in the first computer, the first LI interface being an instance of an original interface in the first computer and used to perform the function in the first computer; and
invoking the function through the LI interface in response to the application program invoking the function through the RI interface.

14. The article of claim 12 including further instructions which when executed cause the step of sending the instance identifier to further comprise:
packaging the instance identifier and the function identifier in a protocol data unit destined for the second computer; and
sending their protocol data unit into the communication pipe.

15. The article of claim 12 further including instructions which when executed on a remote computer cause the further steps of sending the instance identifier and the function identifier to a plurality of computers according to a multicast protocol.

16. An article of manufacture comprising:
a machine-readable medium having instructions which when executed on a remote computer cause the steps of:
creating a local implementation (LI) interface that defines a function which is implemented in the remote computer in response to a message received from a local computer, the LI interface being an instance of and having the same instance identifier as a remote-implementation (RI) interface in the local computer; and
invoking the function through the LI interface in response to receiving the instance identifier of the LI interface and a function identifier of the function from the local computer.

17. An application sharing session comprising:
first user invoking a function supported by an application residing on the user's first machine;
creating a remote-implementation (RI) interface on the first user's machine, the RI interface defining the function;
creating a local-implementation (LI) interface in a second user's machine as an instance of the RI interface, a copy of the application residing on the second user's machine;
the first user's machine sending an instance identifier for the LI interface and a function identifier for the function to the second user's machine in response to the user invoking the function; and
performing the function by the copy of the application in the second user's machine through the LI interface in response to receiving the instance identifier and the function identifier.

* * * * *